US012794057B2

(12) United States Patent
Lee et al.

(10) Patent No.: US 12,794,057 B2
(45) Date of Patent: Nov. 10, 2026

(54) BATTERY MODULE AND BATTERY PACK INCLUDING THE SAME

(71) Applicant: LG Energy Solution, Ltd., Seoul (KR)

(72) Inventors: Hyunjae Lee, Daejeon (KR); Junyeob Seong, Daejeon (KR); Yongjoon Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 839 days.

(21) Appl. No.: 17/767,684

(22) PCT Filed: Aug. 11, 2020

(86) PCT No.: PCT/KR2020/010602
§ 371 (c)(1),
(2) Date: Apr. 8, 2022

(87) PCT Pub. No.: WO2021/075689
PCT Pub. Date: Apr. 22, 2021

(65) Prior Publication Data

US 2023/0143556 A1 May 11, 2023

(30) Foreign Application Priority Data

Oct. 14, 2019 (KR) ........................ 10-2019-0127010

(51) Int. Cl.
*H01M 50/204* (2021.01)
*H01M 50/244* (2021.01)
(Continued)

(52) U.S. Cl.
CPC ....... *H01M 50/204* (2021.01); *H01M 50/244* (2021.01); *H01M 50/507* (2021.01); *H01M 50/517* (2021.01)

(58) Field of Classification Search
CPC ............. H01M 50/204; H01M 50/244; H01M 50/507; H01M 50/517
See application file for complete search history.

(56) References Cited

U.S. PATENT DOCUMENTS

2012/0129041 A1 5/2012 Komazawa
2013/0017436 A1* 1/2013 Kume ................ H01M 50/503 429/158
(Continued)

FOREIGN PATENT DOCUMENTS

CN 102468473 A 5/2012
CN 103843175 A 6/2014
(Continued)

OTHER PUBLICATIONS

WO-2019107938-A1 machine translation (Year: 2019).*
(Continued)

*Primary Examiner* — Stewart A Fraser
*Assistant Examiner* — Quintin D. Elliott
(74) *Attorney, Agent, or Firm* — Lerner David LLP

(57) ABSTRACT

A battery module of the present disclosure includes: a cell assembly including at least one battery cell; a bus bar assembly including a terminal bus bar electrically connected to the electrode lead of the cell assembly, and a bus bar frame for covering the cell assembly on at least one side; and an insulating frame for covering the bus bar assembly from the outside, wherein the battery module comprises a nut adjacent to the terminal bus bar and mounted in a nut insertion chamber having a space inside the insulating frame, and the insulating frame comprises a protrusion that protrudes from a side wall of the nut insertion chamber and makes contact with the nut.

10 Claims, 7 Drawing Sheets

(51) Int. Cl.

| | |
|---|---|
| ***H01M 50/507*** | (2021.01) |
| ***H01M 50/517*** | (2021.01) |

(56) References Cited

U.S. PATENT DOCUMENTS

| | | | |
|---|---|---|---|
| 2014/0212724 | A1 | 7/2014 | Lee et al. |
| 2015/0086846 | A1 | 3/2015 | Baek et al. |
| 2016/0036028 | A1 | 2/2016 | Tsuruta et al. |
| 2017/0324131 | A1 | 11/2017 | Sumida et al. |
| 2018/0159096 | A1 | 6/2018 | Kim et al. |
| 2020/0076025 | A1 | 3/2020 | Jo et al. |
| 2020/0168879 | A1 | 5/2020 | Kim et al. |
| 2020/0194843 | A1 | 6/2020 | Kwon et al. |

FOREIGN PATENT DOCUMENTS

| | | | | | |
|---|---|---|---|---|---|
| CN | 107710450 | A | | 2/2018 | |
| CN | 207183361 | U | | 4/2018 | |
| CN | 208955358 | U | | 6/2019 | |
| JP | S58-135517 | U | | 9/1983 | |
| JP | S62-013217 | U | | 1/1987 | |
| JP | 2013020855 | A | | 1/2013 | |
| JP | 2016100572 | A | | 5/2016 | |
| JP | 2018170433 | A | * | 11/2018 | |
| JP | 2019-053928 | A | | 4/2019 | |
| KR | 20150033023 | A | | 4/2015 | |
| KR | 20150070701 | A | | 6/2015 | |
| KR | 20160016613 | A | | 2/2016 | |
| KR | 20170054878 | A | | 5/2017 | |
| KR | 20190064839 | A | | 6/2019 | |
| KR | 20190064887 | A | | 6/2019 | |
| WO | 2019-088803 | A1 | | 5/2019 | |
| WO | WO-2019107938 | A1 | * | 6/2019 | ............ H01M 50/20 |

OTHER PUBLICATIONS

JP-2018170433-A Machine Translation.*

Extended European Search for Application No. 20877566.8 dated Mar. 3, 2023. 9 pgs.

International Search Report for PCT/KR2020/010602 dated Nov. 30, 2020. 3 pgs.

* cited by examiner

【FIG. 1】
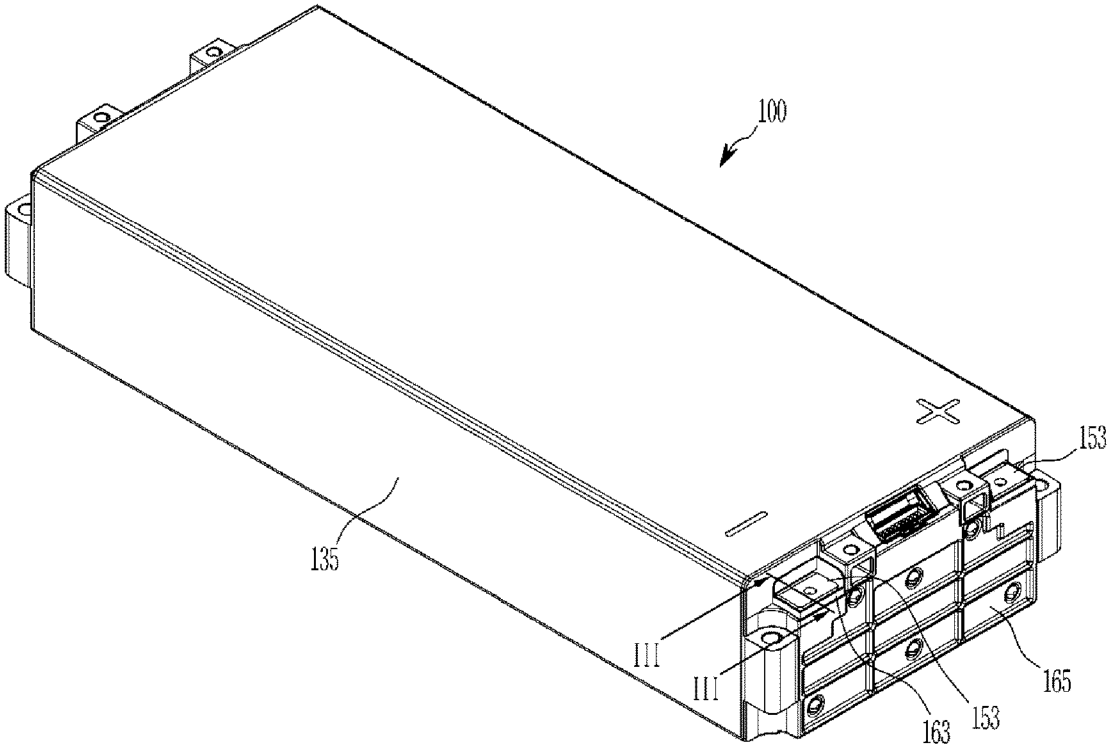

【FIG. 2】
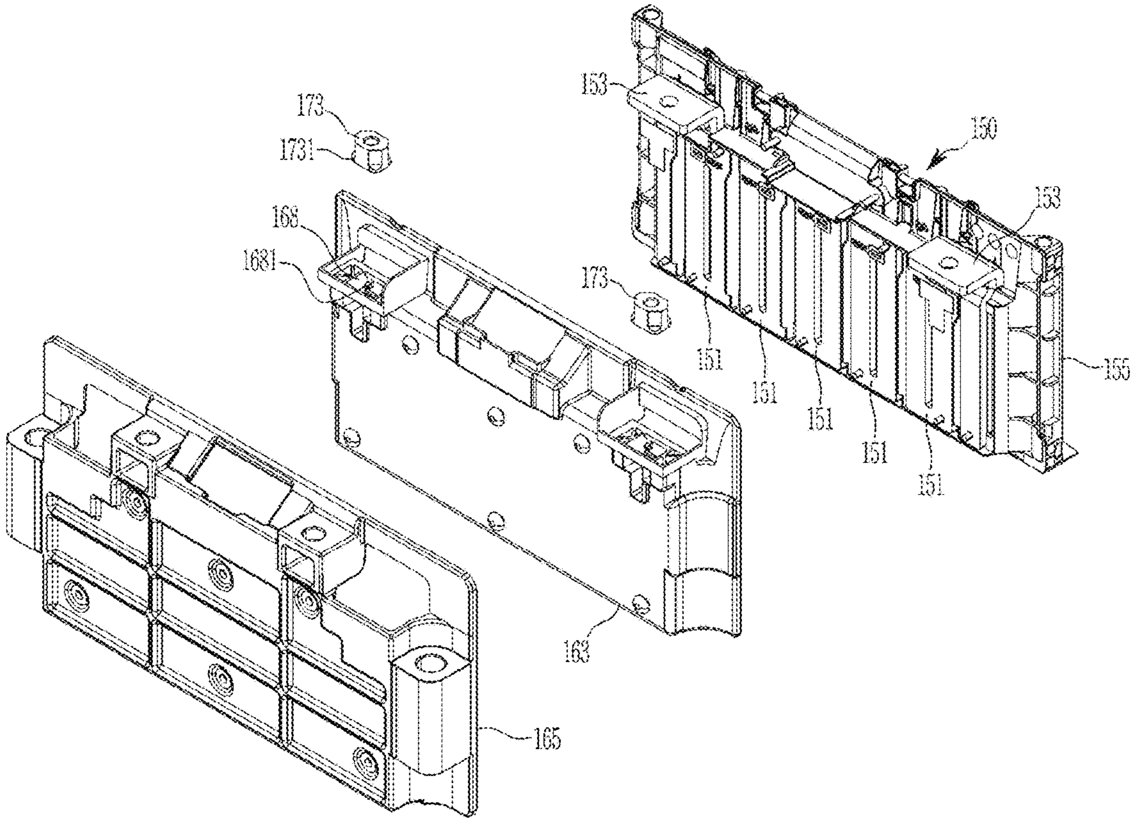

【FIG. 3】
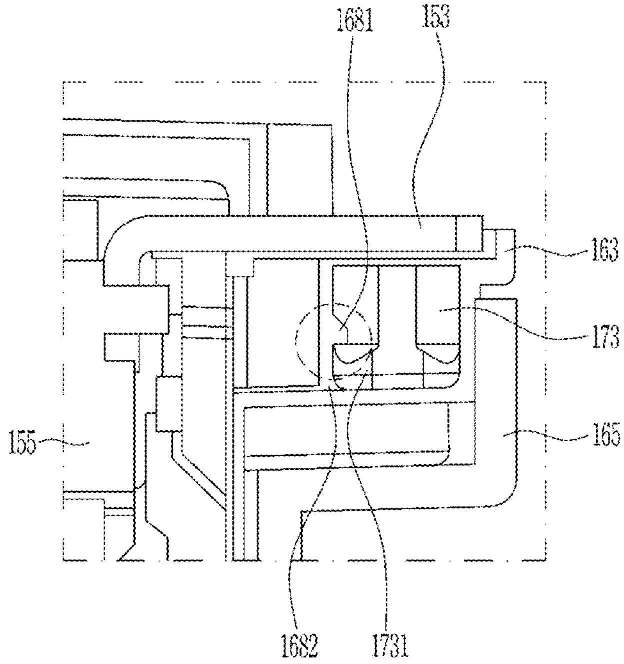

【FIG. 4】
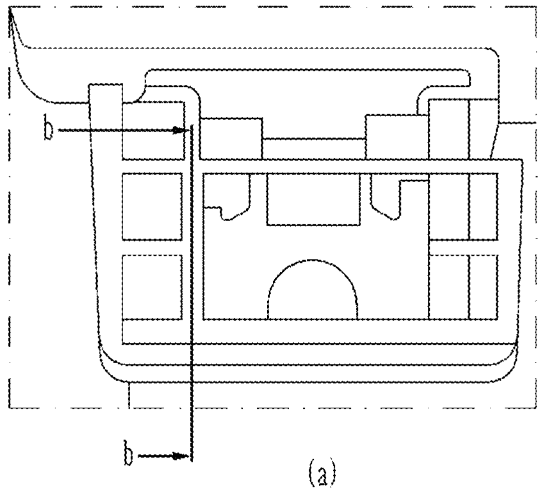
(a)
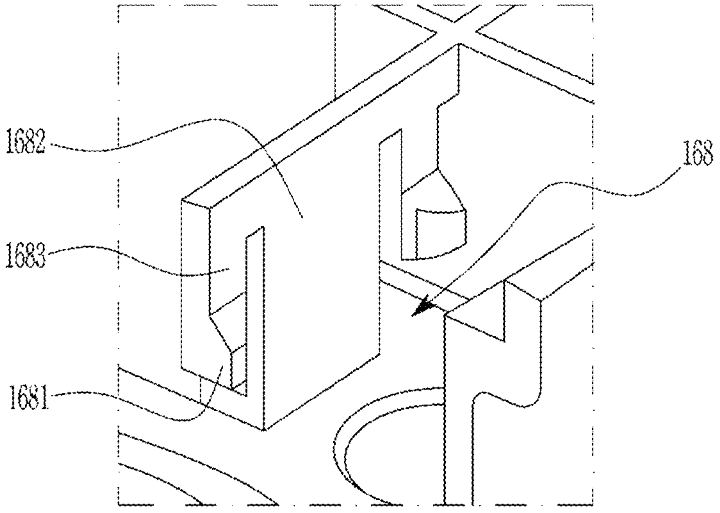
(b)

【FIG. 5】
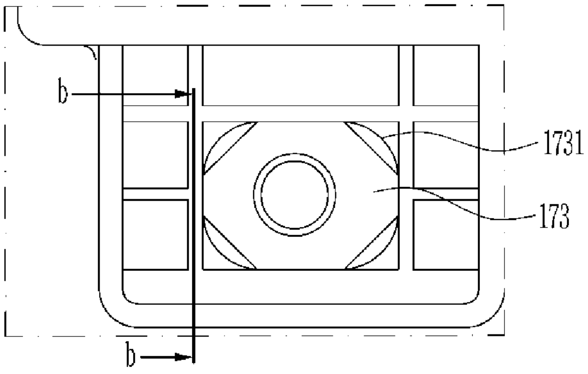
(a)
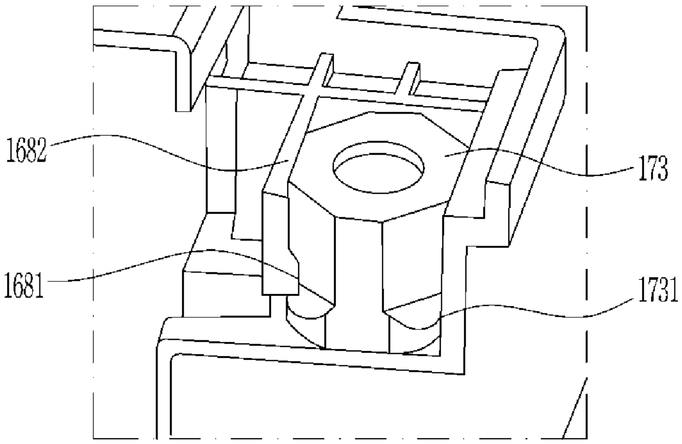
(b)

【FIG. 6】
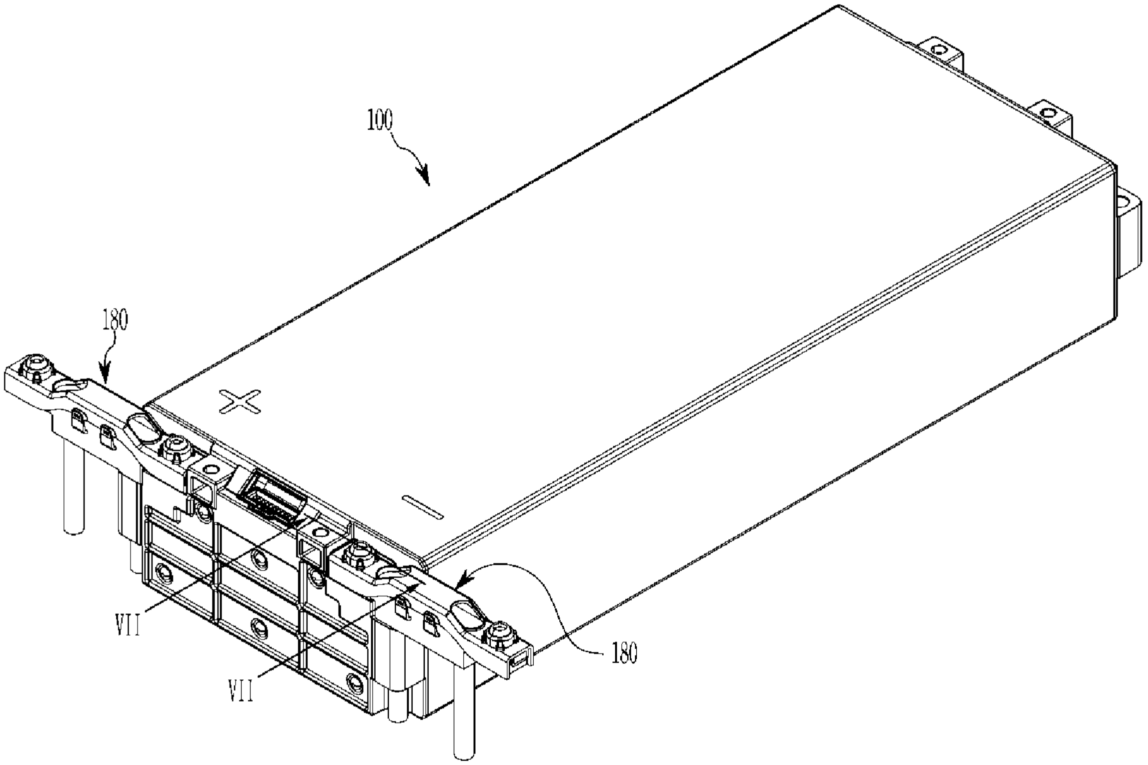

【FIG. 7】
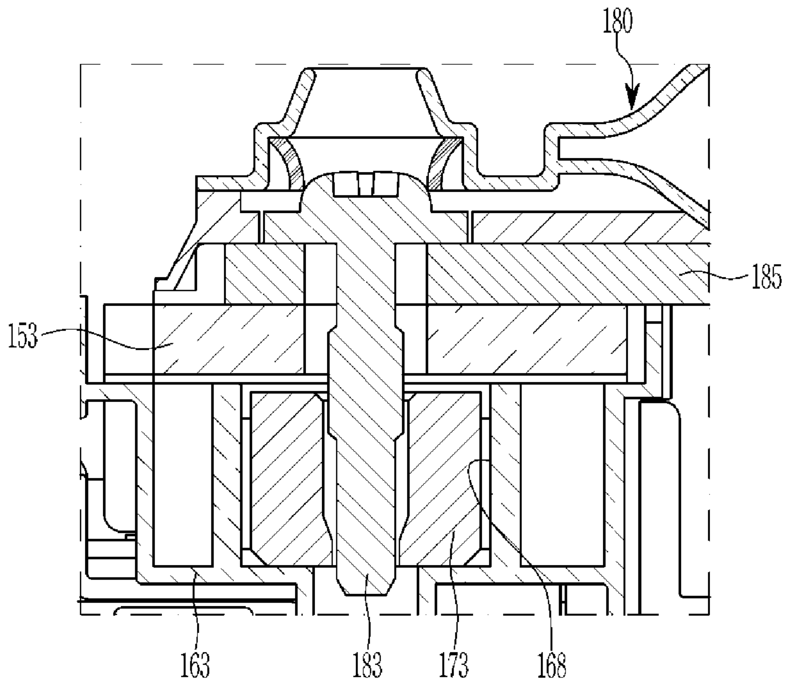
【FIG. 8】
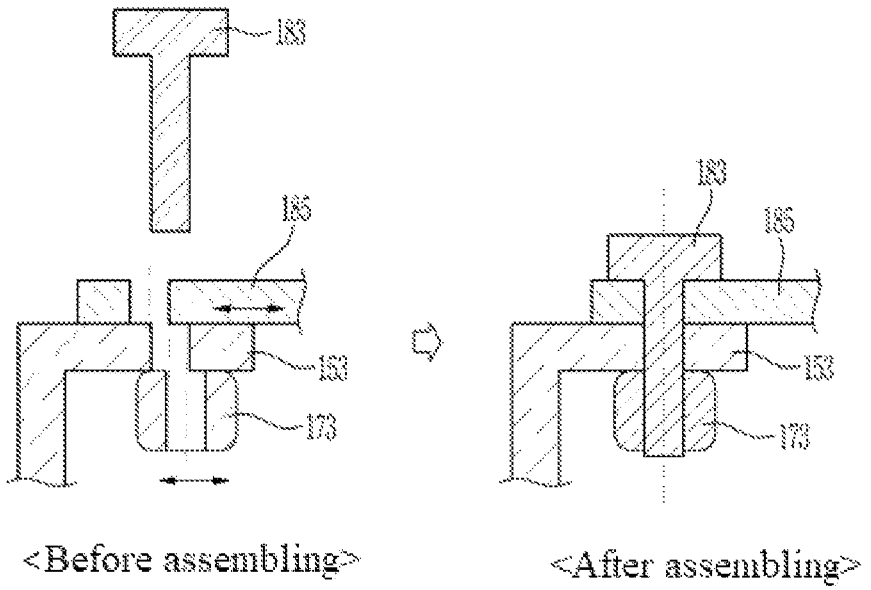

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/010602, filed on Aug. 11, 2020, published in Korean, which claims priority to Korean Patent Application No. 10-2019-0127010, filed on Oct. 14, 2019, the entire contents of which are incorporated herein by reference.

TECHNICAL FIELD

Background Art

Since secondary batteries are easily applicable to various product groups and has electrical characteristics such as high energy density, they are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

A battery pack applied to an electric vehicle and the like has a structure in which a plurality of cell assemblies including a plurality of unit cells are connected in series to obtain high output. And, the unit cell can be repeatedly charged and discharged by an electrochemical reaction between components, including a positive electrode current collector, a negative electrode current collector, a separator, an active material, an electrolyte and the like.

Meanwhile, recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

When a plurality of battery cells are connected in series/parallel to configure a battery pack, a method of configuring a battery module composed of at least one battery cell and then adding other components to at least one battery module to configure a battery pack is common. The number of battery modules included in the battery pack or the number of battery cells included in the battery module may be variously set according to the required output voltage or charge/discharge capacity.

In order to connect a plurality of battery modules to each other, a terminal connection structure may be fastened between battery modules adjacent to each other, and in this case, the bolt and nut fastening structure can be applied. However, it is necessary to control a precise position in order to assemble the bolt to the nut that is completely fixed to the battery module. Consequently, the relative assembling property of the bolts can be reduced and the defective rate can be increased. In addition, additional processes such as bonding and welding are required in order to bind the nut to the battery module, resulting in an increase in the price of parts. In order to solve these problems, an unfixed nut was sometimes used, but in this case, problems such as detachment of the nut may also occur.

DETAILED DESCRIPTION OF THE INVENTION

Technical Problem

It is an object of the present disclosure to provide a battery module in which a structure in which the nut can flow is created in the terminal connection structure between battery modules, thereby improving the assembling property of the bolt and nut and at the same time preventing the detachment of nut.

It is another object of the present disclosure to provide a battery pack configured such that a plurality of battery modules having such a nut structure is fastened to each other with a terminal connection structure.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a cell assembly including at least one battery cell; a bus bar assembly including a terminal bus bar electrically connected to the electrode lead of the cell assembly, and a bus bar frame for covering the cell assembly on at least one side; and an insulating frame for covering the bus bar assembly from the outside, wherein the battery module comprises a nut adjacent to the terminal bus bar and mounted in a nut insertion chamber having a space inside the insulating frame, and the insulating frame comprises a protrusion that protrudes from a side wall of the nut insertion chamber and makes contact with the nut.

The nut has a size that can move in right and left directions in the nut insertion chamber, and when the nut moves, the protrusion may be configured to spread in the outside direction of the nut insertion chamber.

The nut has a jaw portion at the lower portion that protrudes toward the side wall of the nut insertion chamber from the main body of the nut, and the jaw portion may interfere with the protrusion and limit the vertical movement of the nut.

A fastening hole is formed in the terminal bus bar, and the nut may be mounted in the nut insertion chamber so that the screw hole at least partially overlaps the fastening hole.

The protrusion may include an inclined surface connected to the side wall at an upper portion.

The nut insertion chamber and the protrusion may be formed together during an injection process of the insulating frame.

The protrusion may be formed on a side wall adjacent to the bus bar in the nut insertion chamber.

The protrusion may be formed in a branch portion that protrudes from the upper portion of the side wall to the side surface and extends downward.

According to another embodiment of the present disclosure, there is provided a battery pack comprising the plurality of battery modules, and a bolt that passes through the fastening hole of the terminal bus bar to be screw-coupled to the screw hole of the nut.

The battery pack includes a terminal connection structure having an inter-module bus bar that connects the terminal bus bars of the adjacent battery modules, wherein the bolt may pass through the inter-module bus bar to be coupled to the nut.

The bolt may pass through the screw hole of the nut to be fixed to the insulating frame.

According to yet another embodiment of the present disclosure, there is provided a device comprising the at least one battery pack.

Advantageous Effects

According to embodiments, the nut is mounted on the outer terminal connection part of the battery module to secure a movable space, so that not only it is possible to improve the ease of fastening with the bolt for connection with adjacent battery modules, but also it is possible to improve the assembly speed because control of the precise position of bolt and nuts is not required, and further the defective rate due to assembly errors can be reduced.

Furthermore, even if the nut moves for the ease of assembly, the movement in up and down directions is restricted, thereby preventing occurrence of problems such as detachment of the nut.

BRIEF DESCRIPTION OF THE DRAWINGS

FIG. 1 is a perspective view showing a battery module according to one embodiment of the present disclosure;

FIG. 2 is an exploded perspective view showing a bus bar assembly, an insulating frame, and an end plate of a battery module according to one embodiment of the present disclosure;

FIG. 3 is a cross-sectional view taken along the line III-III of FIG. 1;

FIG. 4 is a diagram showing a state before the nut is arranged in the nut mounting chamber of the insulating frame of the battery module according to one embodiment of the present disclosure;

FIG. 5 is a diagram showing a state in which a nut is arranged in a nut mounting chamber of an insulating frame of a battery module according to one embodiment of the present disclosure;

FIG. 6 is a perspective view showing a state in which a terminal connection structure is fastened to a battery module according to one embodiment of the present disclosure;

FIG. 7 is a cross-sectional view taken along the line VII-VII of FIG. 6; and FIG. 8 is a schematic diagram showing a process of assembling a terminal connection structure to a battery module according to one embodiment of the present disclosure, and the relative positions of the bolt in the assembled state, the fastening hole of the terminal bus bar, the screw hole of the nut, and the fastening hole of the inter-module bus bar.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Further, throughout the specification, when a portion is referred to as "including" a certain component, it means that the portion can further include other components, without excluding the other components, unless otherwise stated.

FIG. 1 is a perspective view showing a battery module according to one embodiment of the present disclosure. FIG. 2 is an exploded perspective view showing a bus bar assembly, an insulating frame, and an end plate of a battery module according to one embodiment of the present disclosure.

Referring to FIGS. 1 and 2, the battery module 10 according to embodiments of the present disclosure includes a cell assembly, a bus bar assembly 150 on at least one side of a module case 135 that houses this cell assembly and forms the exterior of the battery module 100, and an insulating frame 163. The bus bar assembly 150 may be configured such that the bus bar 151 is fixed outwardly to the bus bar frame 155 located on the side surface of the direction in which the electrode lead of the cell assembly is drawn out. The electrode lead of the cell assembly can pass through a slit formed in the bus bar frame 155 to be electrically connected to the bus bar 151. The insulating frame 163 is arranged outside the bus bar assembly 150. The insulating frame 163 is arranged adjacent to the bus bar assembly 150, and the end plate 165 covers the insulating frame 163 and is located on the outside thereof.

Each of the insulating frame 163 and the bus bar frame 155 may be made of a non-conductive injection molding material, and the end plate 165 may be made of a metallic material.

The battery cells constituting the cell assembly may be provided as pouch-type secondary batteries, and may be provided by stacking a plurality of cells in the cell assembly. The plurality of battery cells may be electrically connected to each other, and each of the battery cells protrudes from the electrode assembly, a battery case for housing the same, and an electrode lead that protrudes outward from the battery case and is electrically connected to the electrode assembly.

In addition, the battery module 100 may include various electronic components, and for example, it may include an ICB (Internal Circuit Board), a BMS (Battery Management System), and the like. Electrical components such as the ICB and the BMS board can be electrically connected to the plurality of battery cells.

The battery module 100 can form a module terminal portion that plural numbers are electrically coupled adjacent to each other. In this embodiment, the battery module 100 may include terminal bus bars 153 located at the outermost side of the bus bars fixed to the bus bar frame 155. The terminal bus bar 153 may include a plate that is bent perpendicularly to the main surface of the bus bar frame 155 at the upper end, so that a fastening hole may be formed in the plate.

FIG. 3 is a cross-sectional view taken along the line III-III of FIG. 1. FIG. 4 is a diagram showing a state before the nut is arranged in the nut mounting chamber of the insulating frame of the battery module according to one embodiment of the present disclosure. FIG. 5 is a diagram showing a state in which a nut is arranged in a nut mounting chamber of an insulating frame of a battery module according to one embodiment of the present disclosure.

A nut insertion chamber 168 can be provided adjacent to the terminal bus bar 153 within the insulating frame 163. A space is provided in the nut insertion chamber 168 so that the nut 173 can be mounted, and the nut 173 is mounted in the nut insertion chamber 168. In this embodiment, the insulating frame 163 includes a protrusion 1681 that protrudes from the side wall 1682 of the nut insertion chamber 168 and makes contact with the nut 173. The nut insertion chamber 168 has a substantially rectangular flat cross-section, and the width of the nut 173 in the first direction may be formed smaller than the width of the nut insertion chamber 168 in the first direction. Here, the first direction can be defined as a direction parallel to the long side of the insulating frame 163. Also, the width of the nut 173 in the second direction may be formed to be the same as the width of the nut insertion chamber 168 in the second direction. Here, the width of the nut insertion chamber 168 in the second direction means the width between the most protruding portion of the protrusion 1681 and the opposite side wall. Therefore, basically, when the nut 173 is mounted in the nut insertion chamber 168, it does not move to an extent sufficient to separate from the nut insertion chamber 168 because it makes contact with the protrusion 1681.

Further, in the case of the protrusion 1681, which is a configuration of the insulating frame 163 formed of an injection-molded material, a gap can be widen outward when force is applied by the movement of the nut 173, thereby providing a sufficient space for the nut 173 to move in the left and right directions. Therefore, when the bolt is inserted into the insertion hole of the nut 173, the degree of freedom of the nut 173 can be increased by allowing it to move in the left and right directions.

As shown in FIG. 4, the protrusion 1681 may be formed at an end of the branch portion 1683 that protrudes to the side surface from the upper portion of the side wall 1682 and extends downward. The branch portion 1683 may be spaced apart from the side wall 1682 at a distance, and may have a configuration in which only the upper portion is connected to the side wall 1682. With such a configuration, the margin that the protrusion 1681 located at the end of the branch portion 1683 can form a gap to the outside becomes larger, so that the degree of freedom of the nut 173 can be further increased.

An inclined surface extending from the side wall 1682 toward the nut 173 may be formed on the upper portion of the protrusion 1681. That is, when the nut 173 is inserted from the upper portion, it can be more easily mounted in the nut insertion chamber 168 along the inclined surface.

Meanwhile, the lower portion of the nut 173 has a jaw portion 1731 protruding from the body of the nut 173 toward the side wall 1682 of the nut insertion chamber 168, and the jaw portion 1731 interferes with the protrusion 1681 to prevent the nut 173 from moving up and down. Thereby, while the nut 173 can move to the left and right while pushing out the protrusion 1681 at the time of assembly, and at the same time, the vertical flow of the nut 173 is prevented by the coupling of the protrusion 1681 and the jaw portion 1731, so that even before assembling, it is possible to prevent the nut 173 from being detached during a procedure such as a process.

A terminal bus bar 153 may be arranged above the nut insertion chamber 168 on which the nut 173 is mounted. This is positioned when the bus bar assembly 150 to which the terminal bus bar 153 is fixed and the insulating frame 163 provided with the nut insertion chamber 168 are coupled to each other. A fastening hole is formed in the terminal bus bar 153, and when a bolt passes through the terminal bus bar 153 to be fastened to the nut 173, it can be fastened through the fastening hole. And, the nut 173 is mounted in the nut insertion chamber 168 so that the screw hole overlaps at least partially with the fastening hole. This makes it possible to improve the ease of fastening when inserting the bolt into the nut 173 for electrical connection between the battery modules, and increase the working speed. This will be described below using a schematic diagram.

The nut insertion chamber 168 and the nut 173 inserted therein may be arranged on both sides of the insulating frame 163 in the plane direction, that is, one-by-one on both sides in the first direction. Terminal connection structures are respectively fastened to the nuts 173 arranged on both sides through bolts, and can used for electrical connection with battery modules adjacent to both sides.

FIG. 6 is a perspective view showing a state in which a terminal connection structure is fastened to a battery module according to one embodiment of the present disclosure, and FIG. 7 is a cross-sectional view taken along the line VII-VII of FIG. 6.

Referring to FIG. 6, the terminal connection structure 180 can be fastened to the module terminal portion in order to fasten the adjacent battery module 100. The terminal connection structure 180 can be fixed to the end plate 165. The module terminal portion may include a terminal bus bar 153 and a nut 173 mounted in the nut insertion chamber 168. The end plate 165 exposes the terminal bus bar 153 fixed to the bus bar assembly 150 while being coupled to the insulating frame 163 and the bus bar assembly 150, the coupling with the adjacent battery module can be achieved while the terminal connection structure 180 fixed to the end plate 165 is coupled to the terminal bus bar 153.

Referring to FIG. 7, the terminal connection structure 180 may include an inter-module bus bar 185 that provides electrical connection between adjacent battery modules, and a bolt 183 for coupling the inter-module bus bar 185 with the terminal bus bar 153 of each battery module 100. That is, the bolt 183 may pass through the inter-module bus bar 185 and the terminal bus bar 153 to be screw-coupled to the screw hole of the nut 173. At this time, the bolt 183 may pass through the fastening hole of the inter-module bus bar 185 and the fastening hole of the terminal bus bar 153, respectively, and can be coupled to the nut 173 mounted in the nut insertion chamber 168. In addition, the bolt 183 can be fixed to the insulating frame 163 through the screw hole of the nut 173.

FIG. 8 is a schematic diagram showing a process of assembling a terminal connection structure to a battery module according to one embodiment of the present disclosure, and the relative positions of the bolt, the fastening hole of the terminal bus bar, the screw hole of the nut, and the fastening hole of the inter-module bus bar in the assembled state.

If the relative positions of the screw holes of the nut 173, and the fastening holes of the terminal bus bar 153 and the inter-module bus bar 185 are slightly misaligned before assembling, first, the fastening hole of the inter-module bus bar 185 is in a state of being not yet coupled and thus, is moved to the right and left to align with the hole of the terminal bus bar 153. However, in the case of the screw hole of the nut 173, if the nut 173 is fixed and the left and right movement does not occur at all, complementation is impossible. However, according to one embodiment of the present disclosure, when allowing the nut 173 to move by an external force, a gap of the protrusion 1681 is widened outward and the position can be moved to a prescribed position. That is, since the nut 173 can move while pushing the protrusion 1681 in the nut insertion chamber 168, the nut 173 can move more or less along the insertion position of the bolt 183. Therefore, precise control is not required to fasten the bolt 183 to the terminal bus bar 153 and the nut 173 for electrical connection of the adjacent battery module 100. As the end of the bolt 183 is inserted into the fastening hole of the terminal bus bar 153 and the inter-module bus bar 185, the nut 173 moves in the nut insertion chamber 168 so that the screw hole of the nut 173 is aligned with the end of the bolt 183, and the bolt 183 and the nut 173 can be fastened without interference. That is, before assembling, the flow of the nut 173 is restricted to some extent by the protrusion 1681, and when assembling, the degree of freedom of the nut 173 is increased by slightly pushing the protrusion 1681 to the outside, thereby absorbing the tolerance of the bolt 183 and the assembly tolerance, and thus ensure the fastening property of the bolt 183 and the nut 173.

Meanwhile, one or more battery modules according to the embodiments of the present disclosure can be packaged in a pack case while being electrically connected to each other through a terminal connection structure, thereby forming a battery pack. That is, the plurality of battery modules can be electrically connected by fixing the inter-module busbars connecting the terminal busbars of the adjacent battery modules using bolts, thereby configuring a battery pack.

The above-mentioned battery pack and battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

| | |
|---|---|
| 100: battery module | 135: module case |
| 150: bus bar assembly | 151: bus bar |
| 153: terminal busbar | 155: busbar frame |
| 163: insulation frame | 165: end plate |
| 168: nut insertion chamber | 173: nut |
| 1681: protrusion | 180: terminal connection structure |
| 183: bolt | |

The invention claimed is:

1. A battery module comprising:

a cell assembly including at least one battery cell and an electrode lead connected to the at least one battery cell;

a bus bar assembly including a terminal bus bar electrically connected to the electrode lead of the cell assembly, and a bus bar frame covering the cell assembly on at least one side thereof;

an insulating frame covering an outside of the bus bar assembly; and a nut adjacent to the terminal bus bar and mounted in a nut insertion chamber defining a space inside of the insulating frame, the nut having a width smaller than a width of the nut insertion chamber in right and left directions of the nut insertion chamber, so that the nut has freedom of motion within the nut insertion chamber in the left and right directions, wherein the insulating frame has a protrusion that protrudes from a side wall of the nut insertion chamber and contacts the nut, wherein a first end of the protrusion is connected to the side wall, and the protrusion is cantilevered, such that when the nut moves, a second end of the protrusion opposite the first end is configured to deflect in an outside direction of the nut insertion chamber relative to the side wall, the outside direction being perpendicular to the left and right directions, such that the nut has freedom of motion within the nut insertion chamber in the outside direction when the nut is pressed against the second end of the protrusion, wherein the nut insertion chamber is configured such that when a bolt is inserted into a screw hole extending within the nut with a longitudinal axis of the bolt not being parallel to a longitudinal axis of the screw hole, the nut is configured to align with the bolt by the nut pushing the second end of the protrusion so that the longitudinal axis of the screw hole becomes aligned with the longitudinal axis of the bolt, wherein the protrusion of the insulating frame extends from a branch portion of the insulating frame that protrudes from an upper portion of the side wall of the nut insertion chamber towards a side surface of the insulating frame, and the branch portion extends downward from the upper portion of the side wall in a direction parallel to the longitudinal axis of the screw hole of the nut, and wherein the branch portion is spaced apart from a lower portion of the side wall, and the protrusion is located only at a lower end of the branch portion.

2. The battery module of claim 1, wherein:

the nut has a jaw portion at a lower portion thereof that protrudes toward the side wall of the nut insertion chamber from a main body of the nut, and the jaw portion interferes with the protrusion in a vertical direction, thereby limiting movement of the nut in the vertical direction.

3. The battery module of claim 1, wherein:

the terminal bus bar has a fastening hole defined therein, and the nut is mounted in the nut insertion chamber so that the screw hole defined within the nut at least partially overlaps the fastening hole in left and right directions of the nut insertion chamber.

4. The battery module of claim 1, wherein:

the protrusion of the insulating frame comprises an inclined surface connected to the side wall of the nut insertion chamber at the upper portion of the protrusion.

5. The battery module of claim 1, wherein:

the nut insertion chamber and the protrusion are integrally formed together during an injection process of the insulating frame.

6. The battery module of claim 1, wherein:

the protrusion of the insulating frame extends from the side wall of the nut insertion chamber adjacent to the bus bar.

7. A battery pack comprising a plurality of battery modules according to claim 1 and a bolt that extends through a fastening hole of the terminal bus bar of one of the battery modules and is screw-coupled to a screw hole of the nut of the one of the battery modules.

8. The battery pack of claim 7, further comprising a terminal connection structure having an inter-module bus bar that connects the terminal bus bars of adjacent ones of the battery modules, wherein the bolt extends through the inter-module bus bar and is coupled to the nut of the one of the battery modules.

9. The battery pack of claim 7, wherein:

the bolt extends through the nut of the one of the battery modules and is fixed to the insulating frame of the one of the battery modules.

10. A device comprising at least one battery pack according to claim 7.

* * * * *